United States Patent
Kshirsagar et al.

(10) Patent No.: US 12,284,175 B2
(45) Date of Patent: Apr. 22, 2025

(54) CONTEXT SPECIFIC USER CHATBOT

(71) Applicant: Salesforce, Inc., San Francisco, CA (US)

(72) Inventors: Atul Chandrakant Kshirsagar, San Ramon, CA (US); Makarand Vishwas Bhonsle, Mountain View, CA (US); Weiqing Wu, Denver, CO (US)

(73) Assignee: Salesforce, Inc., San Francisco, CA (US)

( * ) Notice: Subject to any disclaimer, the term of this patent is extended or adjusted under 35 U.S.C. 154(b) by 352 days.

(21) Appl. No.: 17/649,508

(22) Filed: Jan. 31, 2022

(65) Prior Publication Data

US 2023/0247019 A1    Aug. 3, 2023

(51) Int. Cl.
| G06F 7/04 | (2006.01) |
| G06F 15/16 | (2006.01) |
| H04L 9/40 | (2022.01) |
| H04L 29/06 | (2006.01) |
| H04L 51/02 | (2022.01) |

(52) U.S. Cl.
CPC .......... *H04L 63/0853* (2013.01); *H04L 51/02* (2013.01); *H04L 63/102* (2013.01)

(58) Field of Classification Search
CPC .......................... H04L 63/0853; H04L 63/102
USPC ............................................................ 726/4
See application file for complete search history.

(56) References Cited

U.S. PATENT DOCUMENTS

| 8,302,176 | B2 | 10/2012 | Huang | |
| 8,689,290 | B2 | 4/2014 | Buer | |
| 8,739,266 | B2 | 5/2014 | Buer | |
| 2018/0332042 | A1* | 11/2018 | Yu | ........................... H04L 67/02 |
| 2019/0036864 | A1* | 1/2019 | Reuss | ................. H04W 12/108 |
| 2022/0191026 | A1* | 6/2022 | Perpetua, Jr. | ......... H04L 9/3239 |

* cited by examiner

*Primary Examiner* — Brandon Hoffman
*Assistant Examiner* — Samuel Ambaye
(74) *Attorney, Agent, or Firm* — Polygon IP, LLP (57) ABSTRACT

Some implementations of the disclosed systems, apparatus, methods and computer program products may provide for chatbots configured to perform tasks requiring end user identification on behalf of users. Such a chatbot may be authenticated through tokens with custom claims. The custom claims may include identifying or authenticating tokens received by the chatbot or server system and the chatbot may create and/or provide such tokens for authentication. The custom claim may be configured to provide user identifying data, allowing for the chatbot to be provided with end user credentials. Accordingly, chatbots may be utilized to perform sensitive tasks that require user credentials while continuing to provide security for users.

19 Claims, 7 Drawing Sheets

CONTEXT SPECIFIC USER CHATBOT

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to chatbot systems and more specifically to chatbot system configured to perform actions that are typically only performed by end users.

BACKGROUND

Bots may perform actions on behalf of a requesting user, such as booking a reservation, booking an appointment, creating a case, and other such actions. Such actions are performed by the bot as a "system" user. A "system user" may be a user that does not include identifying information of the requesting user. Bots acting as "system users" are limited in the amount of tasks that can be performed, as certain tasks may require handling of identifying information and are thus unable to be performed by a "system user."

BRIEF DESCRIPTION OF THE DRAWINGS

The included drawings are for illustrative purposes and serve only to provide examples of possible structures and operations for the disclosed inventive systems, apparatus, methods and computer program products for a chatbot that is capable of performing tasks requiring end user identification. These drawings in no way limit any changes in form and detail that may be made by one skilled in the art without departing from the spirit and scope of the disclosed implementations.

DETAILED DESCRIPTION

Some implementations of the disclosed systems, apparatus, methods and computer program products are configured to provide for a chatbot configured to perform tasks requiring end user identification on behalf of users. In various implementations, the chatbot may receive a chat request from a user that requires end user credentials. The end user may provide user identifying data. The chatbot may then create a token that includes such a user identifying data within a custom claim. The custom claim may be configured to provide such user identifying data, allowing for the chatbot to be provided with end user credentials. Accordingly, chatbots may be utilized to perform sensitive tasks that require user credentials while continuing to provide security for users.

Typically, bots perform actions on the behalf of live requesting users as a system user. As a system user, the chatbot may perform actions that do not require identifying information of the requesting user. Bots that are limited to performing actions on behalf of the user as a system user are limited in the amount of tasks that can be performed, as certain tasks may require handling of identifying information, requiring user authentication, and are thus unable to be performed by a system user. Simply allowing the bot to be able to perform tasks that require identifying information of a user exposes sensitive user identifying information to automated bots. The systems and techniques described herein allow for bots to temporarily provide user credentials to be granted certain end user privileges, in order to provide automated services to requesting users, while protecting sensitive user identifying data.

Paula is an employee of ForcedSales. ForcedSales allows employees to perform certain employee actions with bot assistance. However, due to security considerations, the bot of ForcedSales is unable to perform any actions that would require user identification. Paula thus finds the bot of ForcedSales to be unhelpful, deciding instead to manually perform all actions by herself instead of utilizing the bot. The time wasted on doing all actions by herself lowers her productivity, causing her to miss several important deadlines and hurt ForceSales' quarterly performance.

Figure 1:
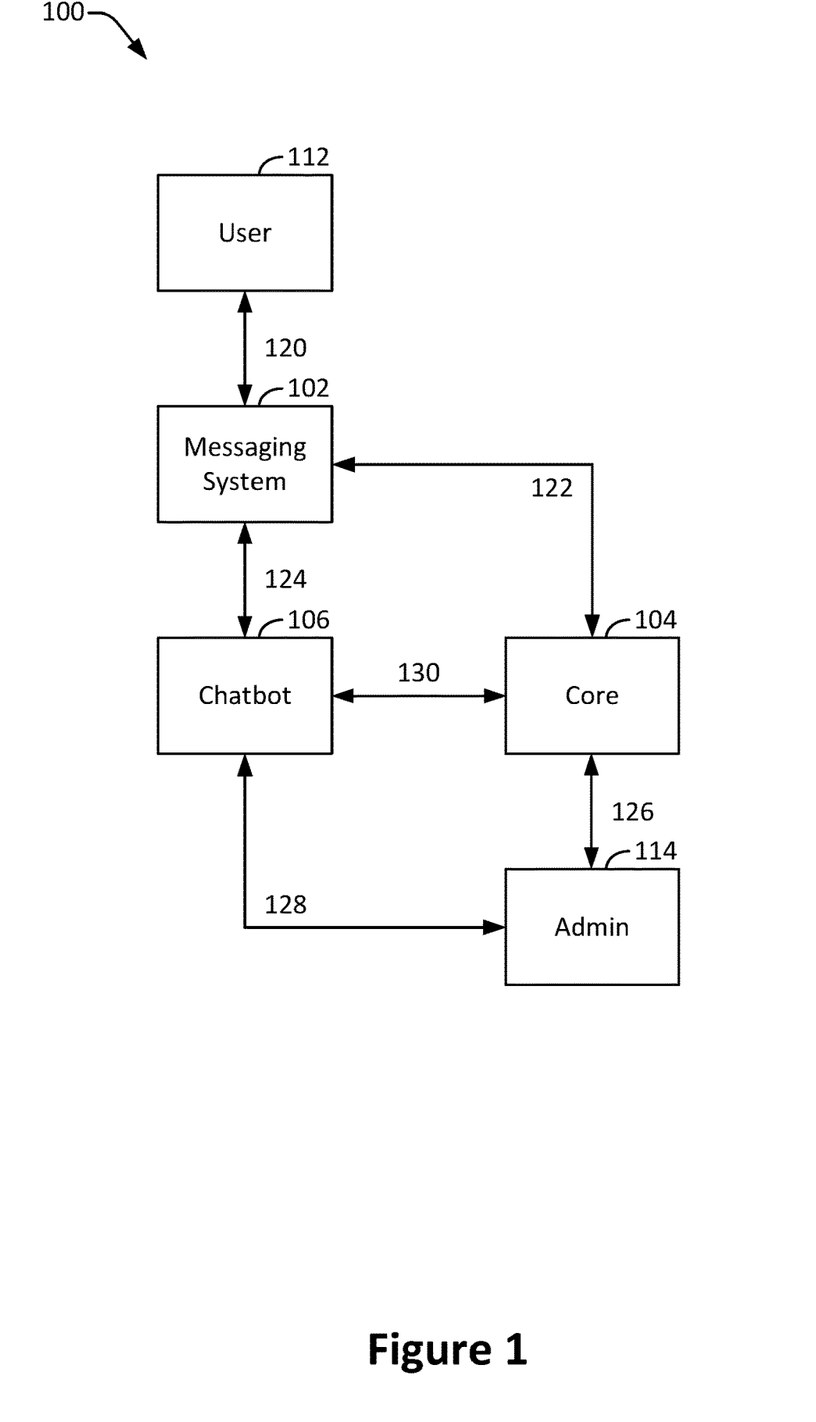
FIG. 1 illustrates an example of an arrangement of components in a computing system for an end user chatbot, configured in accordance with one or more embodiments.

FIG. 1 illustrates an example of an arrangement of components in a computing system for an end user chatbot, configured in accordance with one or more embodiments. FIG. 1 illustrates system 100 that includes messaging system 102, core server 104, chatbot 106, user 112, and admin 114.

Messaging system 102 may be a messaging system that allows for a user to provide messages to core server 104 and/or chatbot 106. Messaging system 102 may communicate one or more user requests (e.g., one or more requests for bot assisted actions performed on behalf of the user 112). Messaging system 102 may be any type of messaging system that allows for communication of messages and/or data to core server 104 and/or chatbot 106. Such messages and/or data may include requests for chatbot 106 to perform one or more actions on the behalf of user 112. Such actions may include actions requiring authentication of user 112 to provide permission to perform such actions. Accordingly, such actions may include, for example, selecting health insurance, changing or selecting retirement plans, accessing sensitive documents, changing benefits selections, and/or other such actions where user 112 commands chatbot 106 to perform actions on user 112's behalf. In various embodiments, such commands may be any type of command appropriate for chatbot 106. Thus, for example, such commands may be text commands, voice commands, and/or other such commands provided by user 112 through an electronic device (e.g., a desktop or laptop computer, a tablet, a wearable device, a smartphone, and/or another such device) that may have messaging system 102 installed or enabled (e.g., messaging system 102 may be installed on the electronic device as an application and/or the electronic device may provide messaging services of messaging system 102 as an API or other function).

Chatbot 106 may be a chatbot configured to perform actions on behalf of user 112. Chatbot 106 may be an automated chatbot configured to receive messages from messaging system 102. In various embodiments, chatbot 106 may be operated via one or more Application Programming Interfaces (APIs). Thus, for example, chatbot 106 may be called via one or more APIs.

Chatbot 106 may be associated with core server 104. Core server 104 may include one or more databases that stores data (e.g., sensitive data, instructions, APIs, and/or other such data) and/or processors configured to perform operations described herein. In various embodiments, core server 104 may be associated with an entity that is associated with user 112 (e.g., an employer of user 112).

In certain embodiments, core server 104 may store configurations for chatbot 106. Such configurations may be set up by admin 114. Thus, admin 114 may setup chatbot 106 directly and/or via core server 104 and core server 104 may accordingly setup chatbot 106. Furthermore, core server 104 may provide authentication of identifying data, authorize chatbot 106 to perform one or more end user actions, access and/or provide data, perform actions based on requests, and/or perform one or more other actions according to the techniques described herein.

Core server 104 may include one or a plurality of server devices. Thus, for example, core server 104 may include a front facing server device configured to communicate with messaging system 102 and a back end server device configured to communicate with chatbot 106. Core server 104 (e.g., the back end server device) may additionally store configuration data and/or may be configured to build or set up chatbot 106.

In various embodiments, chatbot 106 may communicate with core server 104 via communications channel 130. Such communications may include providing data between chatbot 106 and core server 104 according to the techniques described herein to perform the techniques described herein. Furthermore, user 112 (e.g., via an electronic device) may communicate data with messaging system 102 via communications channel 120. Messaging system 102 may communicate data with chatbot 106 via communications channel 124 and with core server 104 via communications channel 122. Admin 114 (e.g., an electronic device of admin 114) may communicate data with chatbot 106 via communications channel 128 and with core server 104 via communications channel 126.

In various embodiments, communications channel 120, 122, 124, 126, 128, and/or 130 may include any type of appropriate communications channels for communicating such data, including wired or wireless communications channels (e.g., Internet communications, Bluetooth, WiFi, Near Field Communications, Ethernet, Local Area Network, and/or other such communications channels or standards).

Figure 2:
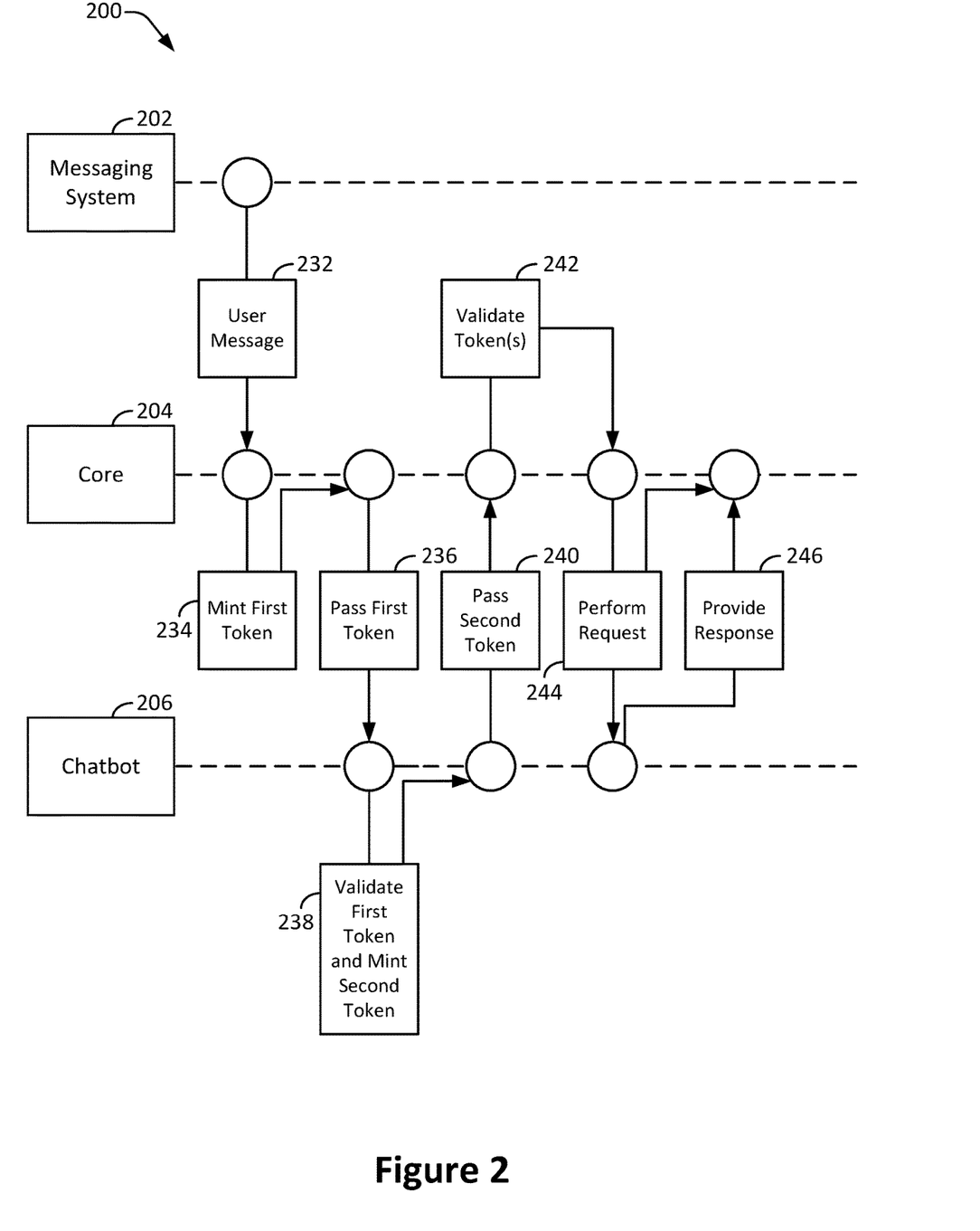
FIG. 2 illustrates an example of an end user chatbot method performed across a system, performed in accordance with one or more embodiments.

FIG. 2 illustrates an example of an end user chatbot method performed across a system, performed in accordance with one or more embodiments. FIG. 2 illustrates context specific chatbot technique 200. Portions of context specific chatbot technique 200 may be performed by messaging system 202, core server 204, and/or chatbot 206. Messaging system 202 may communicate data (e.g., messages) based on one or more user commands received from a user (e.g., through inputs on a Graphical User Interface or GUI of messaging system 202). Messaging system 202, core server 204, and chatbot 206 may be similar to messaging system 102, core server 104, and chatbot 106, respectively, as described in FIG. 1.

In context specific chatbot technique 200, messaging system 202 may receive user input and accordingly create and provide user message in 232 to core system 204. The user message may include a request for performance of one or more actions on behalf of the user by a bot. Such actions may include, for example, a request for sensitive documents, performance of actions that are limited to authenticated users, and/or other such actions. The user message may include the request as well as identifying data for the requesting user. The identifying data may include, for example, a user token that includes identifying information of the user (e.g., a token minted by core server 204 and previously passed to messaging system 202 or created by messaging system 202 after authenticating the user through, for example, successful performance of authentication procedures such as entry of a valid password, performing of 2 factor authentication, validation through face scanning, and/or another such technique). Such identifying data (e.g., provided through the user token) may be of a format compatible with core server 204 and may be, for example, a JavaScript Open Notation (JSON) token and/or another such token. In certain embodiments, the user message may include explicit instructions (e.g., a checked option box or typed text) indicating that the requesting user grants permission of chatbot 206 to perform actions on behalf of the requesting user.

The user message, the user token, or a portion thereof, may, in certain embodiments, be an Open Authorization (OAuth) standard message/format token to allow for the requesting user to pass permission. Such OAuth standard messages/format tokens may include authentication data, such as digital signatures, that are associated with the requesting user. Presentation of such authentication data allows for permission to be granted to chatbot 206 to perform actions on behalf of the requesting user.

In various embodiments, such OAuth standard messages/format tokens become invalid when tampered with (e.g., once the contents of the OAuth standard messages/format tokens is accessed and/or changed, they are no longer valid for additional uses). The systems and techniques described herein allow for untampered and/or unaccessed OAuth standard messages/format tokens to be provided to core system 204 and/or chatbot 206, allowing for chatbot 206 to be validated as an end user by assuming the identity of the end user (e.g., requesting user).

Upon receipt of the user message, core server 204 mints first token in 234. In certain embodiments, core server 204 may confirm that the requesting user has granted permission for chatbot 206 to perform the end user category actions on behalf of the requesting user before minting the first token (e.g. based on the indications within the user message).

The first token may, for example, be a click to call (C2C) JSON web token (JWT) that includes a custom claim. The custom claim may be a portion of the first token that may contain another received token (e.g., the user token received from the user message). Accordingly, the custom claim may allow for the minted first token (or another token that includes the custom claim) to contain another token (e.g., the user token received from the user message that includes identifying data of the user) or other such data. In certain embodiments, the custom claim may allow for the minted token to contain another token (e.g., the user token) without tampering of the other token, increasing confidence in the reliability of the security of the token contained within the custom claim and allowing for OAuth standard messages/format tokens to be provided for authentication purposes, to allow for chatbot 206 to be permitted to perform end user actions. In certain embodiments, the first token may also be cryptographically signed by core server 204 to allow for authentication of the first token.

After creation of the first token, the first token may be communicated to chatbot 206 in 236. The first token may, in certain embodiments, be communicated along with a call to a chatbot runtime API of chatbot 206. In other embodiments, the first token may be communicated within another message or by itself to chatbot 206.

Upon receiving the first token, chatbot 206 then performs a validation of the first token, in 238. Validation of the first token may include, for example, determining whether a custom claim is included within the first token. If a custom claim is not included, chatbot 206 may terminate the request or perform the request as a system user (e.g., chatbot 206 may perform actions that do not require positive user authentication). Whether chatbot 206 terminates the request or proceeds to attempt to perform the request as a system user is determined based on the configuration specified by an administration (e.g., admin 114).

If a custom claim is included within the first token, chatbot 206 may validate the cryptographic signature of core server 204 on the first token. For example, the signature and/or the user token may be compared with signatures and/or copies of the user token that are stored in certain databases to determine validity (e.g., the cryptographic signature of the core server 204 may be stored within one or more such databases and the signed signature and the stored signature may be matched). Additionally or alternatively, a determination may be made that the user token contained within the custom claim has not been accessed at least since it was provided by message system 202 in 232 (e.g., based on change signatures and/or by comparing versions of the token). Validation may include any appropriate electronic validation techniques.

Certain embodiments may, additionally or alternatively, validate that the user token contained within the custom claim is valid (e.g., by matching electronic signatures and/or other aspects of the token with that of a signature or other data stored within a database). Other such embodiments may only validate the cryptographic signature of core server 204 and may not validate the contents of the custom claim, as validation (e.g., accessing) of such tokens, e.g., for OAuth standard contents, may result in the contents becoming invalid for future use.

If the first token is validated, a second token may be minted by chatbot 206. The second token may also include a custom claim. The custom claim of the second token may include one or both of the user token or the first token. The first token included within the second token may be a copy of the first token received, or may be the actual first token received. In embodiments where the user token is accessed, the copy of the first token may first be performed before the custom claim of the first token is accessed to determine the contents of the user token.

Typically, extracting tokens from messages requires a call operation. Including both tokens within a single custom claim may allow both tokens to be extracted with one call operation. Thus, including both tokens within a single custom claim may save processing resources by minimizing call operations. In certain embodiments, the entirety of the first token may be included within the custom claim of the second token. Thus, the custom claim of the second token may include the first token with its custom claim intact. The custom claim of the first token may accordingly include the user token. Such a configuration may create an audit trail of token records, allowing for determination of which parties have received the records and/or which parties have had possible access to the records. In certain embodiments, the second token may be cryptographically signed by chatbot 206, according to the techniques described herein.

The second token may then be passed from the chatbot 206 to core server 204 in 240. The second token may be communicated in 240 according to any communications technique described herein. Upon receiving the second token, core server 204 may validate the second token and/or other tokens in 242.

Validation of the second token may include, for example, validating the electronic signature of the tokens and/or comparing the token to a copy of the token stored within a database. Validation may include any appropriate electronic validation techniques. In various embodiments, where the custom claim of the second token includes both the first token and the user token, the custom claim of the second token may include the first token and the custom claim of the first token stored within the second token may include the user token. Accordingly, core server 204 may first validate the electronic signature of the second token and then extract the first token from the custom claim of the second token and validate the first token (e.g., according to the techniques described herein). After validating the first token, the user token may be extracted from the custom claim of the first token. The user token may then be accordingly validated (e.g., according to the techniques described herein).

At any point within context specific chatbot technique 200, if a token is not validated, the request may be canceled or chatbot 206 may perform the action as a system user. Otherwise, if the tokens are validated, core system 204 may permit chatbot 206 to perform end user actions and chatbot 206 may accordingly perform the requested action as an end user in 244. Thus, accordingly, chatbot 206 may access and provide sensitive documents, perform actions that are limited to authenticated users, such as booking with sensitive information (e.g., identity or credit card information), perform health insurance selections, perform benefits selections, and/or perform other such actions as an end user.

Upon completion of the requested action, confirmation that the action has been performed or is being performed may be provided from chatbot 206 to core server 204, in 246. Core server 204 may then, in certain embodiments, provide such confirmation to the end user via messaging system 202.

Figure 3:
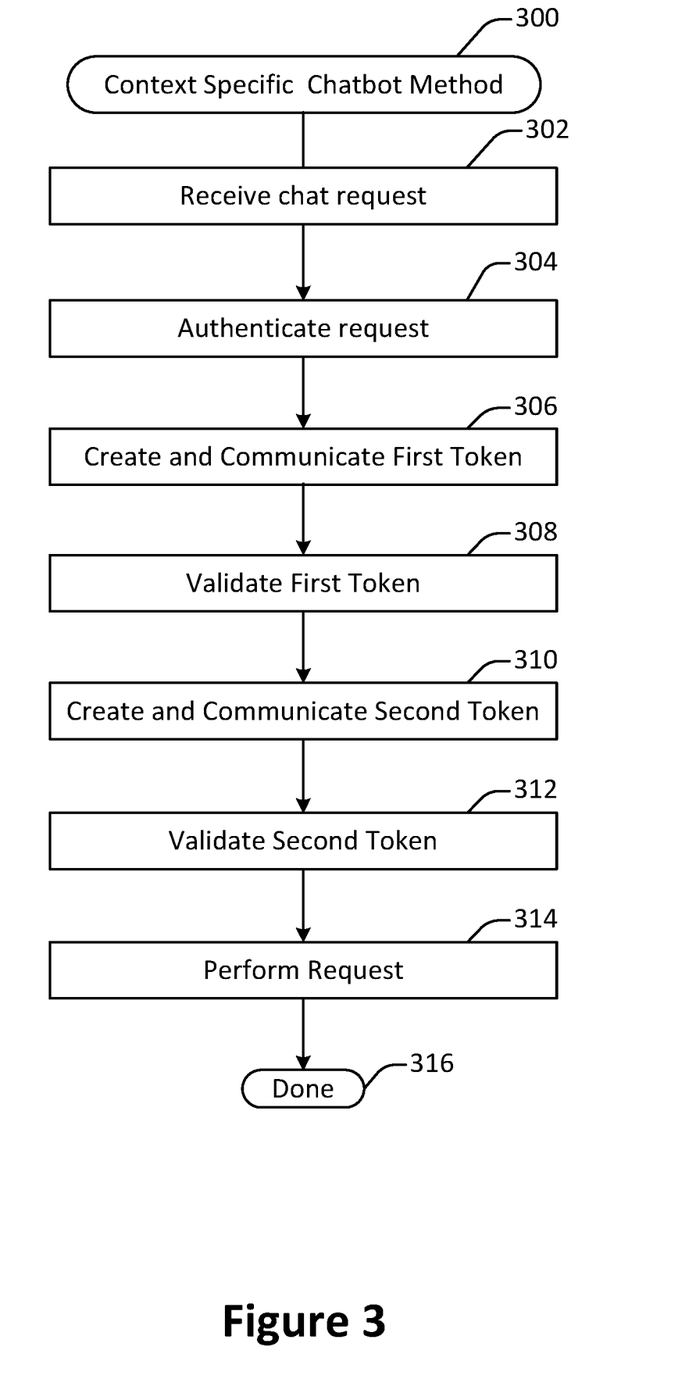
FIG. 3 illustrates an example of an end user chatbot method, performed in accordance with one or more embodiments.

FIG. 3 illustrates an example of an end user chatbot method, performed in accordance with one or more embodiments. FIG. 3 illustrates context specific chatbot method 300.

In 302, a user chat request may be received from a messaging system, based on inputs or actions of the user. The chat request may include a request for performing one or more actions by a chatbot. The chat request may indicate that the user is requesting that the chatbot perform the request as an end user. Such a request may be provided regardless of whether the action is required to be performed in as an end user. In certain embodiments, the chat request may include a user token and/or other identifying data of the user.

In 304, the request may be authenticated. Authentication of the request may include, for example, determining the identity of the user (e.g., by confirming that the user token is valid), determining the credentials of the user (e.g., whether the user is authorized to provide such a request), determining whether the request is valid or allowed, and/or other techniques of authentication. If authentication is unsuccessful, the technique may end.

In 306, based on successful authentication of the request in 304, the request may be received by the chatbot and/or the core server. Accordingly, a first token may be created. The first token may include a custom claim. The custom claim may include the user token and/or other identifying data of the user. In various embodiments, the custom claim may allow for the first token to contain the user token and/or other identifying data of the user while indicating that the user token and/or other identifying data of the user is not tampered with. Thus, for example, the custom claim may be configured to contain the user token and/or other identifying data of the user without requiring the user token and/or other identifying data of the user to be unpacked and its contents determined (e.g., by the chatbot or core server). After creation of the first token, the first token may be communicated. Thus, for example, in certain embodiments, the core server may create the first token and provide the first token to the chatbot, or vice versa. The first token may then be accordingly received.

Upon communication and receipt of the first token, the first token may be validated by the recipient in 308. In various embodiments, tokens may be cryptographically signed by the creator of the token (e.g., the first token may be cryptographically signed by the creator of the first token and the user token may be signed by the account of the user on the messaging system). Validation of the first token may include determining the validity first token and, in certain embodiments if the first token is validated, determining the validity of the user token contained within the custom claim. Other embodiments may not determine the validity of the user token contained within the custom claim. Determining the validity may be according to any of the techniques described herein.

If the first token is validated, a second token may be created in 310. Thus, for example, the first token may be created by the core server and provided to the chatbot and the chatbot may then validate the first token and create the second token, or vice versa. The chatbot may then communicate the second token to the core server, or vice versa.

The second token may be cryptographically signed by the creator of the second token (e.g., with encrypted data identifying that the second token originated from the creator of the second token) and may include a custom claim. The custom claim of the second token may include the first token, which may in turn include the user token and/or other identifying data of the user. In other embodiments, the custom claim of the second token may only include the user token and/or other identifying data of the user.

Upon receipt of the second token, the second token may be validated in 312. Validation of the second token may be according to any techniques described herein and may be, for example, similar to validation of the first token. Thus, for example, the second token may first be validated and then data contained within the custom claim may be validated. Sequential validation first of the token received and then of the data contained within the custom claim may conserve resources as the technique may terminate if the received token is invalid, without requiring the token contained within the custom claim to be unpacked (e.g., due to a call operation) and authenticated.

Based on successful validation of the second token, authorization may be provided to the chatbot to perform the request as an end user, in 314. The request may then be performed and confirmation may be provided to the requesting user.

In various embodiments, a plurality of tokens that includes custom claims may be created and communicated. The plurality of tokens may be variously created by the core server or the chatbot. Authentication of the plurality of tokens may ensure that each of the chatbot and the core server are able to determine that the request is from a valid source and that the end user is properly authorized to request such actions. Such a technique increases user security, allowing for chatbots to securely perform actions that are typically reserved for an end user.

Returning to the example of Paula, ForcedSales has now upgraded their bots to be able to authenticate requests from employees and perform end user actions on behalf of the requesting user, if such actions are allowed. Paula is then able to utilize ForcedSales' new system for all her human resources needs. The system authenticates Paula and is able to determine whether she is allowed to request such actions, before then utilizing a chatbot to perform the requested action. For ForcedSales, the chatbot is an internal chatbot, but they utilize a core server of a third party provider. Nonetheless, the chatbot is a success and Paula regularly uses the chatbot, improving her productivity.

Figure 4:
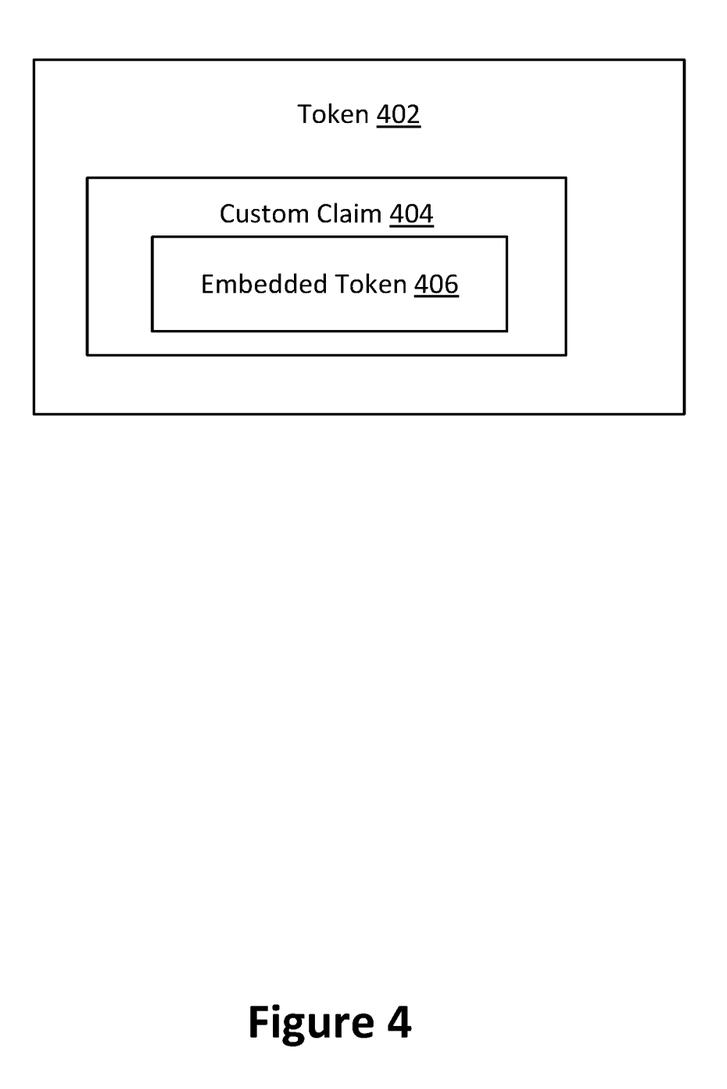
FIG. 4 illustrates an example of a token, configured in accordance with one or more embodiments.

FIG. 4 illustrates an example of a token, configured in accordance with one or more embodiments. FIG. 4 illustrates token 402 that includes custom claim 404. Custom claim 404 contains embedded token 406. Embedded token 406 may be a token or other data that was previously received (e.g., a user token or another token received according to the techniques described herein). Embedded token 406 may be stored within custom claim 404. In certain embodiments, embedded token 406, or the contents thereof, may be unmodified and its data may not be extracted. Accordingly, data of embedded token 406 may be secured.

Figure 5:
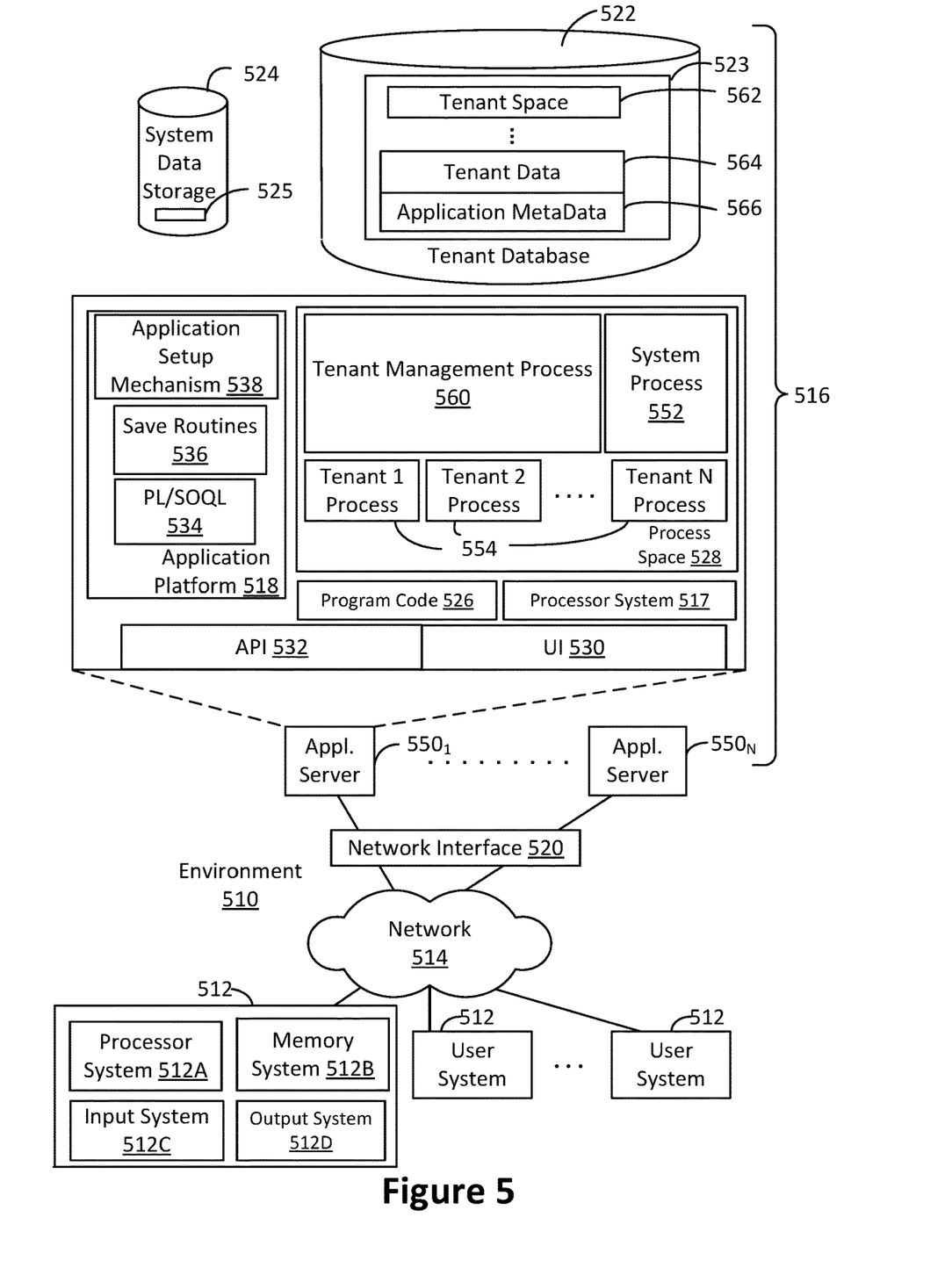
FIG. 5 shows a block diagram of an example of an environment that includes an on-demand multi-tenant resource service, configured in accordance with some embodiments.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based context specific chatbot system. For example, in some implementations, system 516 may include application servers configured to implement and execute context specific chatbot software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a context specific chatbot, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
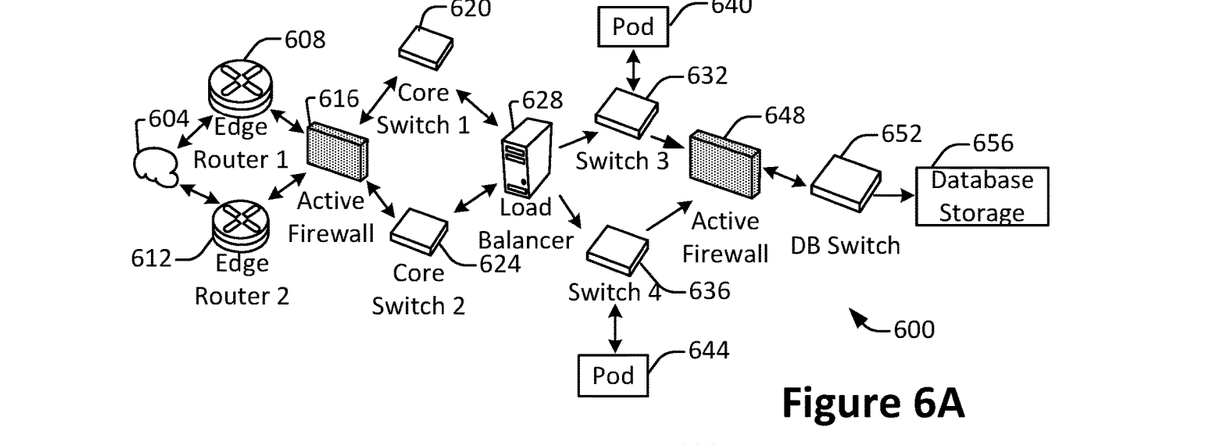
FIGS. 6A and 6B illustrate examples of a computing system, configured in accordance with one or more embodiments.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process chatbot information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
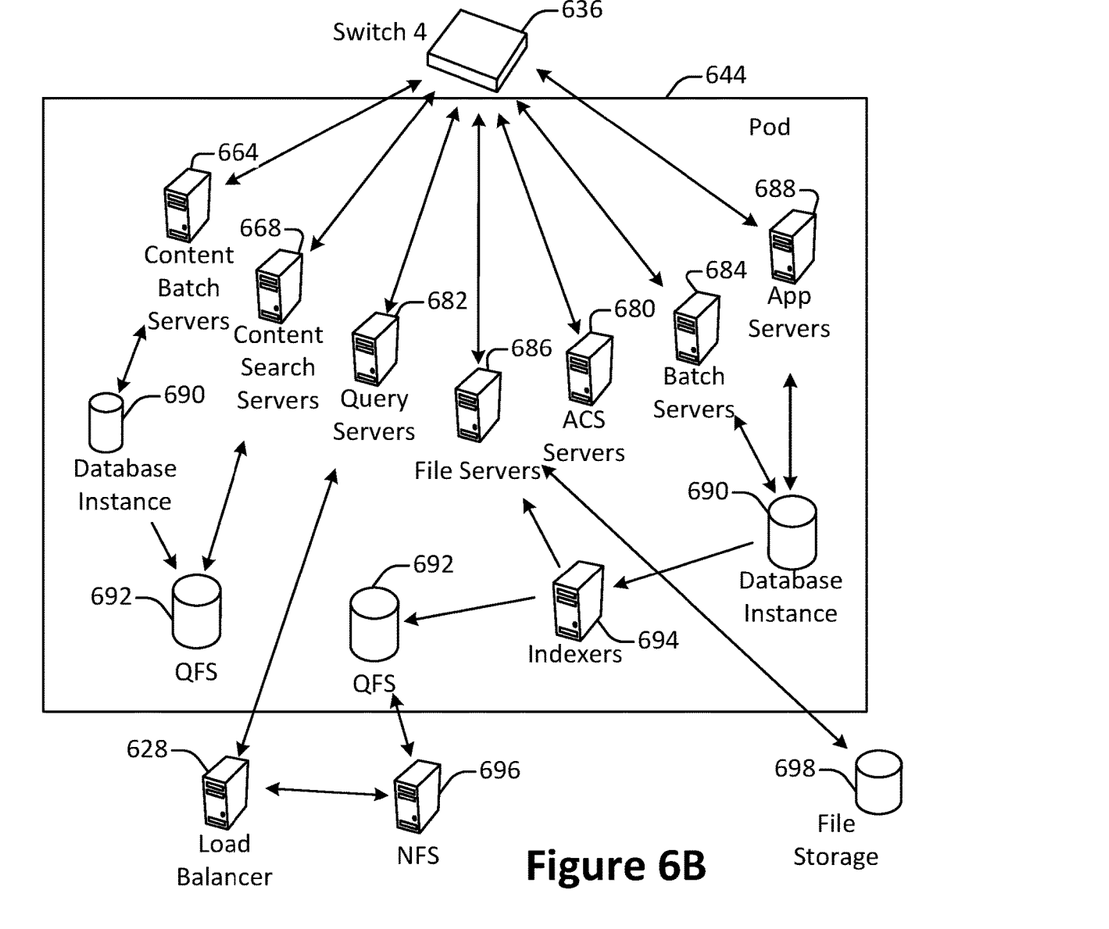

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBS), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
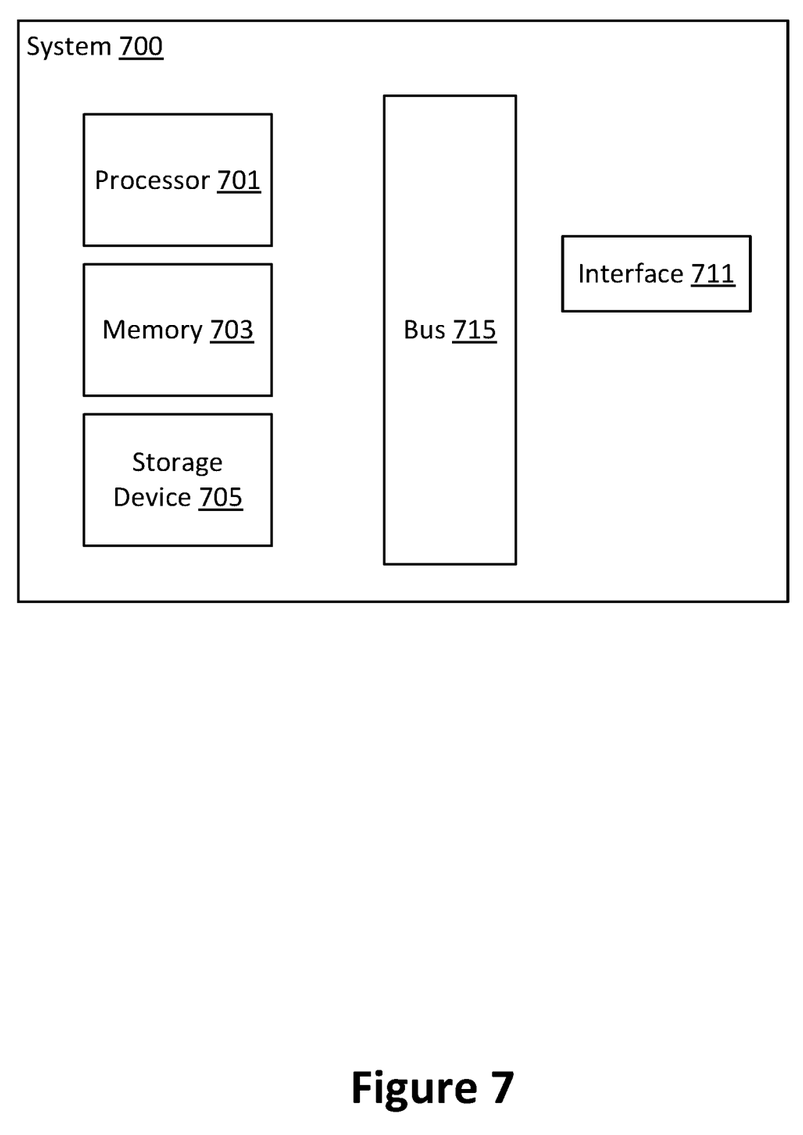
FIG. 7 illustrates an example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A system comprising:
a server device, configured to:
receive a chat request from a user device, the chat request identifying an action for a chatbot to perform on behalf of a user at a third-party system,
determine that the chat request includes user identifying data associated with authentication of the user to a user account, the user identifying data being included in a user authentication token, wherein validation of the user authentication token renders it invalid for subsequent user authentication,
create a first bot token including a bot request associated with the chat request and a first custom claim comprising the user authentication token and a system user signature, and
provide the first bot token to a chatbot; and
the chatbot configured to:
validate the first bot token at least in part by validating the system user signature,
create a second bot token comprising a second custom claim, wherein the second custom claim includes the first bot token, and
perform the action on behalf of the user, wherein performing the action involves the chatbot validating as the user by presenting the user authentication token for validation.

2. The system of claim 1, wherein the user identifying data is included within the first custom claim.

3. The system of claim 2, wherein the first custom claim comprises system token permissions.

4. The system of claim 2, wherein the chat request comprises a request permitted for an end user.

5. The system of claim 2, wherein the first bot token is signed with the system user signature.

6. The system of claim 1, wherein the second bot token is signed by the chatbot with a chatbot signature.

7. The system of claim 6, wherein the server device is further configured to:
receive the second bot token from the chatbot; and
perform first validation of the second bot token by validating the chatbot signature.

8. The system of claim 7, wherein the server device is further configured to:
perform second validation of the second bot token by validating the user identifying data.

9. The system of claim 2, wherein the user identifying data is a user token.

10. A method comprising:
receiving, from a user device, a chat request from a user device, the chat request identifying an action for a chatbot to perform on behalf of a user at a third-party system;
determining that the chat request includes user identifying data associated with authentication of the user to a user account, the user identifying data being included in a user authentication token, wherein validation of the user authentication token renders it invalid for subsequent user authentication;
creating a first bot token including a bot request associated with the chat request and a first custom claim comprising the user authentication token and a system user signature;
providing the first bot token to a chatbot;
validating the first bot token with the chatbot at least in part by validating the system user signature;
create, with the chatbot, a second bot token comprising a second custom claim, wherein the second custom claim includes the first bot token; and
perform the action on behalf of the user, wherein performing the action involves the chatbot validating as the user by presenting the user authentication token for validation.

11. The method of claim 10, wherein the user identifying data is included within the first custom claim.

12. The method of claim 11, wherein the first custom claim comprises system token permissions.

13. The method of claim 11, wherein the chat request comprises a request permitted for an end user.

14. The method of claim 11, wherein the first bot token is signed with the system user signature.

15. The method of claim 10, wherein the second bot token is signed by the chatbot with a chatbot signature.

16. The method of claim 15, wherein the method further comprises:
receiving the second bot token from the chatbot; and
performing first validation of the second bot token by validating the chatbot signature.

17. The method of claim 16, wherein the method further comprises:
performing second validation of the second bot token by validating the user identifying data.

18. The method of claim 11, wherein the user identifying data is a user token.

19. One or more non-transitory computer readable media having instructions stored thereon for performing a method, the method comprising:
receiving, from a user device, a chat request from a user device, the chat request identifying an action for a chatbot to perform on behalf of a user at a third-party system;
determining that the chat request includes user identifying data associated with authentication of the user to a user account, the user identifying data being included in a user authentication token, wherein validation of the user authentication token renders it invalid for subsequent user authentication;
creating a first bot token including a bot request associated with the chat request and a first custom claim comprising the user authentication token and a system user signature;
providing the first bot token to a chatbot;
validating the first bot token with the chatbot at least in part by validating the system user signature;
create, with the chatbot, a second bot token comprising a second custom claim, wherein the second custom claim includes the first bot token; and
perform the action on behalf of the user, wherein performing the action involves the chatbot validating as the user by presenting the user authentication token for validation.

* * * * *